United States Patent [19]

Gerrard et al.

[11] Patent Number: 4,786,619

[45] Date of Patent: Nov. 22, 1988

[54] TELEVISION FACE PLATES RESISTANT TO BROWNING

[75] Inventors: Alan H. Gerrard, Wigan; George W. F. Pardoe, Mawdesley, both of England

[73] Assignee: Pilkington Brothers P.L.C., St. Helens, England

[21] Appl. No.: 68,064

[22] Filed: Jun. 30, 1987

[30] Foreign Application Priority Data

Jun. 30, 1986 [GB] United Kingdom ............... 8615899

[51] Int. Cl.$^4$ ............................................. C03B 5/225
[52] U.S. Cl. ......................................... 501/64; 65/134; 65/32.5; 501/13
[58] Field of Search ................. 65/32, 134; 501/13, 501/64

[56] References Cited

U.S. PATENT DOCUMENTS

| | | |
|---|---|---|
| 1,536,919 | 5/1925 | Parkinson ............................. 501/64 |
| 1,771,435 | 7/1930 | Gelstharp ............................. 501/64 |
| 2,477,329 | 7/1949 | DeGier et al. ....................... 501/64 |
| 3,032,428 | 5/1962 | Ginther ................................. 65/134 |
| 3,422,298 | 1/1969 | DeGier ................................. 501/64 |
| 4,040,809 | 8/1977 | Pecoraro ............................... 65/32 |
| 4,089,693 | 5/1978 | LaGrouw et al. ................... 501/64 |

FOREIGN PATENT DOCUMENTS

| | | | |
|---|---|---|---|
| 1585679 | 9/1968 | France ................................. 501/64 |
| 0007510 | 1/1980 | Japan ................................... 501/64 |

Primary Examiner—Arthur Kellogg
Attorney, Agent, or Firm—Burns, Doane, Swecker & Mathis

[57] ABSTRACT

A television face plate resistant to browning is formed by melting and refining molten glass which contains cerium oxide as an anti-browning agent, the process being carried out in the presence of a sulphur containing compound such that the cerium oxide is converted substantially into the cerous state during melting and refining thereby increasing resistance to browning.

6 Claims, No Drawings

TELEVISION FACE PLATES RESISTANT TO BROWNING

BACKGROUND OF THE INVENTION

This invention relates to improvements in or relating to the manufacture of face plates for television tubes and particularly to face plates which are resistant to browning. One aspect of the invention relates to the production of such face plates by a process in which molten glass is formed into a sheet from which the face plates may be made by flowing the molten glass onto a bath of molten tin.

The use of a molten tin bath for the forming of glass suitable for use as the glass from which T.V. or X-ray absorbing face plates can be formed has been described in e.g. U.S. Pat. No. 4,015,966. X-ray absorbing glasses have been of importance since the advent of television and such glasses must contain materials capable of absorbing X-rays, and of preventing browning due to the absorption of such X-rays in the glass. The inclusion of cerium oxide in the earliest glasses used for the face plates of television sets was described in UK Pat. No. 664769. Such glasses however also contained either or both $As_2O_3$ and $Sb_2O_3$ as refining agents. As indicated in U.S. Pat. No. 4,015,966 such refining agents cannot be present in a molten glass which is to be formed on a molten tin bath. This is because in order to avoid the formation of tin oxide on the surface of the molten tin and in the area surrounding the molten tin, the forming process is carried out in a chamber where the molten tin is protected by the presence of an atmosphere containing a percentage of hydrogen. Thus if sufficient reducible metal oxides are present in the molten glass fed to the surface of the molten tin they will tend to be reduced to a metallic state giving a surface stain in the finished glass. It is thus not possible to use $As_2O_3$ and/or $Sb_2O_3$ as conventional refining agents in a glass to be formed on molten tin in the presence of a reducing atmosphere.

U.S. Pat. No. 4,015,966 suggests that "Refining agents such as fluorides, nitrates and sulphates can be used in place of the arsenic and antimony".

We have now found that it is not possible to achieve a satisfactory degree of refining using nitrates or sulphate alone, and we prefer to avoid the use of fluorides and nitrates in a glass to be formed on molten tin as they can have an adverse effect on the process.

SUMMARY OF THE INVENTION

The present invention is based on the discovery that an X-ray absorbing glass composition suitable for use in forming a glass for a T.V. face plate can be satisfactorily refined in the presence of a minimum level of sodium sulphate and of carbon in the form of anthracite.

In another aspect of the invention, the ability to refine in the presence of a minimum level of sodium sulphate and of carbon as a reducing agent, can be applied to the melting and refining of molten glass to be delivered to a conventional pressing operation in which T.V. glass face plates are formed by forming a gob of glass, and then delivery of the gob to a press for moulding into the shape of a pressed face plate. This would be necessary where pollution legislation or concern about pollution had ruled out the use of $As_2O_3$ and/or $Sb_2O_3$ as refining agents, and an alternative means of refining was needed.

This combination has the result of the glass formation being completed under reducing conditions. This it was realised would convert the cerium oxide present substantially to the cerous state and in view of previous teachings, it was considered possible that this might have reduced the ability of the finished face plate to resist browning. Surprisingly it was found that the finished glass had a better resistance to browning than glasses produced under oxiding conditions which is normal for cathode ray tube glasses.

According to the invention, therefore, there is provided a process for the production of a television face plate resistant to browning by forming a glass into television face plates, in which the melting and refining of the molten glass delivered to the forming process which contains cerium oxide as an anti-browning agent has been carried out in the presence of a sulphur containing compound and where necessary a reducing agent such as carbon, the cerium oxide being converted substantially into the cerous state during melting and refining thereby increasing the resistance of the face plate in use to browning.

The invention, also includes a process for the production of a television face plate resistant to browning by forming a glass into a flat sheet form by means of the float process and subsequently cutting the sheet and forming it into television face plates, in which the melting and refining of the molten glass delivered to the float process which contains cerium oxide as an anti-browning agent has been carried out in the presence of a sulphur containing compound and where necessary a reducing agent such as carbon, the cerium oxide being converted substantially into the cerous state during melting and refining thereby increasing the resistance of the face plate in use to browning.

The invention also includes T.V. glass face plates formed by the process of the invention.

The sulphur compounds used include thiosulphates, sulphates, sulphides and sulphites. In the case of thiosulphates and sulphates, it is essential to also include carbon e.g. in the form of anthracite or sugars to convert the thiosulphate or sulphate to the form necessary to achieve refining.

DESCRIPTION OF THE PREFERRED EMBODIMENTS

All glass compositions used in the formation of T.V. face plates must be capable of a particular level of X-ray absorption. The browning reaction must be not worse than that accepted in current products. The electrical resistivity is conveniently greater than $1 \times 10^7$ ohm/cm at 350° C. The expansion coefficient must be about $99 \times 10^{-7}/°$ C. over the temperature range 25–300° C. to eliminate any problems in sealing the face plate to the one part of the tube. In the case of glass to be made on molten tin, a further desirable feature is that the glass should be of a composition which can follow or precede the manufacture of conventional window glass. This means that the level of MgO and CaO in the glass should be above 1% and preferably present in the ratio 2:3 i.e. the ratio the materials are present in dolomite. Another constraint is the need to keep the overall cost of the batch at a level which does not make the cost of the finished face plate unacceptably high.

Commercially available television face plates have the composition shown in Table I.

TABLE I

|  | CORNING 9068 | OWENS-ILLINOIS | RCA G999 |
|---|---|---|---|
| $SiO_2$ | 63.0 | 64.2 | 62.8 |
| $Na_2O$ | 7.1 | 7.6 | 7.8 |
| $K_2O$ | 8.8 | 8.1 | 8.6 |
| MgO | 0.8 | 0.05 | 1.5 |
| CaO | 1.8 | 2.8 | 2.2 |
| SrO | 10.3 | 9.4 | 10.1 |
| BaO | 2.4 | 2.1 | 2.05 |
| PbO | 2.25 | 2.8 | 2.5 |
| $Al_2O_3$ | 2.1 | 1.3 | 1.85 |
| $TiO_2$ | 0.5 | 0.45 | 0.43 |
| $CeO_2$ | 0.3 | 0.22 | 0.26 |
| $As_2O_3$ | 0.2 | 0.15 | 0.3 |
| $Sb_2O_3$ | 0.4 | 0.4 | 0.5 |

It will be seen that the ranges claimed for glass suitable for forming on molten tin in US Patent Specification 4015966 would embrace the above compositions if they were free of the oxides of lead, arsenic and antimony.

The formulation of some glass compositions satisfactory for use as T.V. face plates is thus within the competence of those practised in the art. Table II illustrates some of the glasses we have found with properties which match not only the characteristics necessary for a satisfactory T.V. face plate but also the forming characteristics necessary to achieve the formation of the molten glass into sheet form on molten tin and can therefore be used in the process of the present invention. In addition these glasses will be found to be refined satisfactorily by the addition of sodium sulphate and carbon to the batch before melting.

TABLE II

|  | CRT 1 | CRT 2 | CRT 3 | CRT 4 |
|---|---|---|---|---|
| $SiO_2$ | 60.1 | 60.1 | 61.05 | 60.0 |
| $Li_2O$ | 0.7 | 0.7 | 0.7 | 0.8 |
| $Na_2O$ | 7.0 | 8.0 | 6.9 | 7.98 |
| $K_2O$ | 8.0 | 7.0 | 7.8 | 7.17 |
| MgO | 0.8 | 0.8 | 0.8 | 1.8 |
| CaO | 1.8 | 1.8 | 1.8 | 4.2 |
| SrO | 10.0 | 10.0 | 10.0 | 0.4 |
| BaO | 5.5 | 5.5 | 5.9 | 13.4 |
| $Al_2O_3$ | 2.1 | 2.1 | 1.3 | 3.6 |
| $TiO_2$ | 0.5 | 0.5 | 0.5 | 0.5 |
| $ZrO_2$ | 3.0 | 3.0 | 2.75 | 0 |
| $CeO_2$ | 0.5 | 0.5 | 0.5 | 0.15 |

The addition of carbon to the batch is preferably made at levels of at least 0.01% of finished glass weight and sulphate of at least 0.2% of finished glass weight. It was found that for a given level of sulphate which is preferably at least 0.5% of finished glass weight it is necessary to use at least 0.06% carbon of finished glass weight. The presence of carbon not only increases the resistance of browning but is essential to avoid a very high retention of $SO_3$ in the glass. The table below shows the $SO_3$ retention behaviour of glass CRT 1 when melted at 1480° C. for 25 minutes, using the same level of sodium sulphate.

TABLE III

| % of finished glass weight | | $SO_3$ Content of finished glass in |
|---|---|---|
| $SO_3$ | Carbon | % wt |
| 0.494% | 0% | 0.46 |
| 0.494 | 0.02 | 0.46 |
| 0.494 | 0.04 | 0.36 |
| 0.494 | 0.06 | 0.22 |

The above table shows that the lower levels of carbon have no or little effect on $SO_3$ retention by the glass. Thus the addition of only sulphate to the glass has little effect on refining due to the very high retention of $SO_3$ in the oxidised glass. The addition of carbon reduces the $SO_3$ content of the finished glass significantly thus indicating a satisfactory achievement of refining. This was confirmed by a bubble count of samples of glass CRT 3 melted with a batch containing 0.494% of $SO_3$ and 0.06% carbon, both as % finished glass weight. Melting for forty minutes at 1450° C. gave a bubble free glass.

Samples of glasses CRT 1, 2, 3 and 4, when submitted to the same browning test as the commercially available glasses all gave a better performance when the glass melting had been carried out in the presence of sufficient carbon to give reducing conditions in the melt.

What is claimed is:

1. A process for the production of a television face plate resistant to browning, which process comprises melting and refining molten glass which comprises cerium oxide as an anti-browning agent and a refining agent comprising a sulphur containing compound, wherein said refining agent is substantially free from an arsenic or antimony oxide containing compound, the cerium oxide being converted substantially into the cerous state during melting and refining thereby increasing the resistance of the face plate in use to browning, and subsequently forming the molten glass into a face plate.

2. The process as claimed in claim 1, wherein said glass is formed into a flat sheet form by means of a float bath process.

3. The process as claimed in claim 1, wherein said sulphur containing compound includes a sulphide or sulphite.

4. The process as claimed in claim 1, wherein said sulphur containing compound includes a thiosulphate or a sulphate, in combination with a reducing agent.

5. A glass face plate for a television tube which plate is formed by a process as claimed in claims 1 or 2.

6. The process as claimed in claim 4, wherein said reducing agent is carbon.

* * * * *